US008947805B1

(12) United States Patent
Coker et al.

(10) Patent No.: US 8,947,805 B1
(45) Date of Patent: Feb. 3, 2015

(54) LOW COMPLEXITY INTER-TRACK INTERFERENCE CANCELLATION RECEIVER FOR MAGNETIC MULTIPLE-INPUT, MULTIPLE-OUTPUT (MIMO) CHANNEL

(71) Applicant: HGST Netherlands B.V., Amsterdam (NL)

(72) Inventors: Jonathan Darrel Coker, Rochester, MN (US); Travis Roger Oenning, Rochester, MN (US); Srinivasan Surendran, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/218,036

(22) Filed: Mar. 18, 2014

(51) Int. Cl.
*G11B 20/10* (2006.01)
(52) U.S. Cl.
USPC .......................................... 360/39
(58) Field of Classification Search
USPC ........................................ 360/39, 29, 46, 51
See application file for complete search history.

(56) References Cited

U.S. PATENT DOCUMENTS

| | | | |
|---|---|---|---|
| RE36,671 E * | 4/2000 | Minuhin et al. | 360/46 |
| 6,239,936 B1 * | 5/2001 | Abraham et al. | 360/75 |
| 6,590,734 B1 * | 7/2003 | Ell | 360/78.05 |
| 6,826,140 B2 | 11/2004 | Brommer et al. | |
| 2004/0037202 A1 | 2/2004 | Brommer et al. | |
| 2005/0232174 A1 * | 10/2005 | Onggosanusi et al. | 370/286 |
| 2007/0019316 A1 * | 1/2007 | Norton | 360/29 |
| 2007/0042717 A1 * | 2/2007 | Alexiou et al. | 455/69 |
| 2008/0089455 A1 * | 4/2008 | Onggosanusi et al. | 375/350 |
| 2010/0150279 A1 * | 6/2010 | Arar | 375/340 |
| 2012/0063023 A1 | 3/2012 | Mathew et al. | |
| 2012/0105994 A1 | 5/2012 | Bellorado et al. | |
| 2013/0003214 A1 | 1/2013 | Grundvig et al. | |
| 2013/0021689 A1 | 1/2013 | Haratsch et al. | |
| 2013/0027801 A1 | 1/2013 | Kumar et al. | |
| 2013/0070362 A1 | 3/2013 | Mathew et al. | |
| 2013/0083418 A1 | 4/2013 | Worrell et al. | |
| 2014/0160590 A1 * | 6/2014 | Sankaranarayanan et al. | 360/45 |

* cited by examiner

*Primary Examiner* — Tan X Dinh
(74) *Attorney, Agent, or Firm* — Billion & Armitage; Michael A. Collins

(57) ABSTRACT

A receiver utilizes a plurality of read elements, each generating a read-back signal in response to a data track positioned beneath the read element. The plurality of read-back signals are each provided to at least one space-time interference cancellation filter, which generates a filtered output that maximizes a signal associated with one of the plurality of data tracks. The filtered output is provided to a one-dimensional Viterbi detector, which is configured to generate in response an output representative of a data sequence written to one of the plurality of data tracks.

17 Claims, 2 Drawing Sheets

LOW COMPLEXITY INTER-TRACK INTERFERENCE CANCELLATION RECEIVER FOR MAGNETIC MULTIPLE-INPUT, MULTIPLE-OUTPUT (MIMO) CHANNEL

TECHNICAL FIELD

This disclosure relates to magnetic recording systems, and in particular to receivers for decoding read-back signals associated with the magnetic recording system.

BACKGROUND

Memory storage density is a measure of the quantity of information (i.e., bits) that can be stored on a given length of track, area of surface, or in a given volume of a computer storage medium. Generally, higher density is more desirable, because it allows greater volumes of data to be stored in the same physical space. Density therefore has a direct relationship to storage capacity of a given medium. Density also generally has a fairly direct effect on the performance within a particular medium, as well as price. Hard drives store data in the magnetic polarization of small patches of the surface coating on a (normally) metal disk. The maximum areal density is constrained by the size of the magnetic particles in the surface, as well as the size of the "head" used to read and write the data.

To increase areal density, magnetic recording systems have begun using "shingled" writing schemes, in which newly written tracks partially overwrite previously written tracks. This has the effect of narrowing the previously written tracks, with resulting widths less than the width of the write head. As a result, track density and therefore areal density is increased. However, read-back signals associated with "shingled" writing schemes exhibit increased inter-track interference (ITI), with resulting adverse effects on bit-error and sector-error rates (BERs and SERs). For example, in a shingled writing scheme, a newly written track is labeled n while adjacent, partially overwritten tracks are labeled n−1 and n+1. Magnetic recording typically employs a 'write wide, read narrow' strategy. In such a scenario, the minimum lithographic feature for magnetic recording is the magnetic read width (MRW), and, as such, is a critical dimension in future areal density improvements. In present shingled writing systems, MRW is typically 60% of track pitch (TP). Scaling track pitch, for instance, to achieve areal density gains would require a smaller MRW. However, smaller MRWs result in decreased signal-to-noise ratio (SNR) and increased occurrence of head instabilities. A system that overcomes the limitations of MRW to increase areal densities would therefore be desirable.

SUMMARY

In general, this disclosure describes techniques for the read back of data from a magnetic storage medium. In particular, this disclosure describes techniques for processing signals read-back from a disk of a hard disk drive.

According to one example of the disclosure, a receiver utilizes a plurality of read elements, each generating a read-back signal in response to a data track positioned beneath the read element. The plurality of read-back signals are each provided to at least one space-time interference cancellation filter, which, based on the plurality of read-back signals, generates a filtered output that maximizes a signal associated with one of the plurality of data tracks. The filtered output is provided to a one-dimensional Viterbi detector, which is configured to generate in response an output representative of a data sequence written to one of the plurality of data tracks.

According to another example of the disclosure, a magnetic storage system is described that includes a magnetic medium having a plurality of data tracks. In addition, a plurality of read elements, each read element positioned over one of the plurality of data tracks and configured to generate a read-back signal in response, at least in part, the data track associated with the read element. The system further includes at least one space-time interference cancellation filter configured to receive read-back signals generated by the plurality of read elements and to provide a filtered read-back signal associated with one of the data tracks. The system also includes at least one 1-dimensional Viterbi detector configured to provide in response to the filtered read-back signal an output representative of a data sequence written to one of the plurality of data tracks.

According to another embodiment of the disclosure, a method of reading data from a magnetic media is described. The method includes generating read-backs signals using a plurality of read elements, each read element positioned over one of a plurality of data tracks. Each of the plurality of read-back signals is then provided to at least one space-time cancellation filters. In response to the plurality of read-back signals, a filtered output is generated that maximizes a signal associated with one of the plurality of data tracks.

DETAILED DESCRIPTION

Disclosed herein is a read-back system that utilizes a low-complexity inter-track interference and cancellation receiver that provides a low-cost approach to mitigating inter-track-interference (ITI) generated in read-back signals. In particular, the read-back system employs a plurality of read elements are positioned over adjacent tracks. The read-back signals generated by each of the plurality of read elements include ITI generated in response to adjacent tracks. The low-complexity inter-track interference and cancellation receiver includes one or more space-time interference cancellation filters optimized to maximize signal to interference plus noise ratio (SINR) associated with a particular data track. The filtered output of each filter represents a read-back signal relatively free of ITI generated in response to adjacent tracks. As a result, well-known one-dimensional partial-response (PR) equalizers and Viterbi detectors may be used to detect stored data based on the filtered output. The read-back system may be employed in multiple-input, multiple-output (MIMO) read-back channels, which includes both multiple-input, single-output (MISO) channels, and single-input, multiple-output (SIMO) channels.

Figure 1:
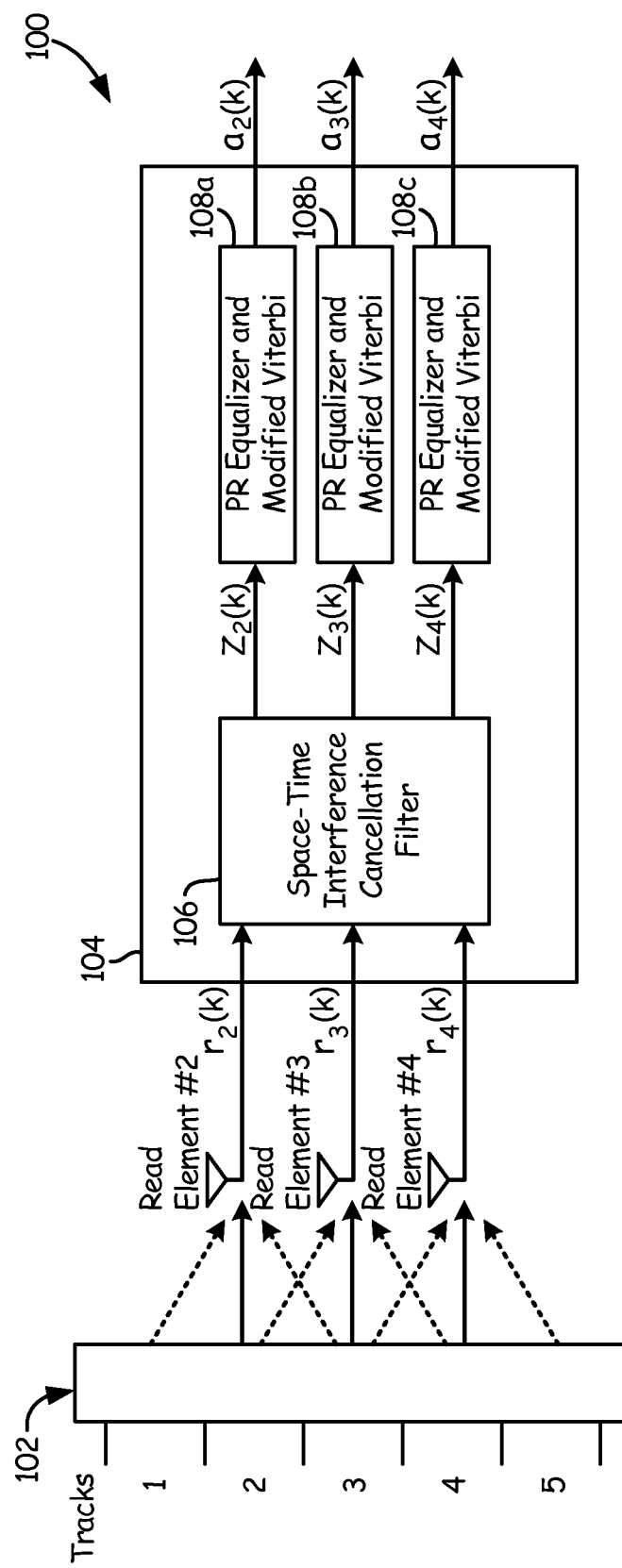
FIG. 1 is block diagram of a magnetic storage system that utilizes a low complexity inter-track interference and cancellation receiver according to an embodiment of the present invention.

FIG. 1 is block diagram of magnetic storage system 100 that utilizes a low complexity inter-track interference and cancellation receiver 104 (hereinafter, cancellation receiver 104) according to an embodiment of the present invention. Magnetic storage system 100 includes magnetic media 102, a plurality of read elements (labeled RE2, RE3, and RE4), and cancellation receiver 104, which includes space-time interference cancellation filter 106 and partial-response (PR) and modified Viterbi detectors 108a, 108b, and 108c. Magnetic media 102 is comprised of a plurality of data tracks (labeled 'T1', 'T2', 'T3', 'T4', and 'T5'). The numerical suffix associated with each read element (e.g., read element RE2) indicates the data track over which the read element is positioned. For example, read element RE2 is located over data track T2, while read element RE3 is located over data track T3 and read element RE4 is located over data track T4. Although in the embodiment shown in FIG. 1, three read elements are employed, in other embodiments any number of read elements greater than two may be employed. Furthermore, while the cancellation receiver 104 is particularly beneficial in applications in which ITI is a significant factor in read-back signals (e.g., shingled magnetic recording systems), the present invention is not limited to these applications and may provide benefits to any magnetic storage recording system.

In the embodiment shown in FIG. 1, read element RE2 generates a read-back signal $r_2(k)$, read element RE3 generates a read-back signal $r_3(k)$, and read element RE4 generates a read-back signal $r_4(k)$. Each read-back signal includes not only a response to the data track intended to be read, but also inter-track interference (ITI) or cross-talk due to side reading of adjacent tracks by each read element. This problem is heightened in magnetic storage systems in which the width of the read elements increases or the width of the data tracks decreases relative to one another. For example, read-back signal $r_2(k)$ is generated in response not only to the target data track (i.e., data track T2), but includes ITI associated with adjacent data tracks T1 and T3. Likewise, read-back signal $r_3(k)$ is generated in response to target data track T3, but includes ITI associated with adjacent data tracks T2 and T4, and read-back signal $r_4(k)$ is generated in response to target data track T4, but ITI associated with data tracks T3 and T5.

The read-back signals $r_2(k)$, $r_3(k)$, and $r_4(k)$ are provided to cancellation receiver 104 for detection of the signals associated with one or more of the data tracks being read by read elements RE2, RE3, and R4. For example, in the embodiment shown in FIG. 1, cancellation receiver 104 generates in response to the received read-back signals $r_2(k)$, $r_3(k)$, and $r_4(k)$ a plurality of outputs $a_2(k)$, $a_3(k)$, and $a_4(k)$ representing the data symbol sequences stored to data tracks T2, T3, and T4, respectively. In another embodiment, cancellation receiver 104 utilizes the plurality of read-back signals $r_2(k)$, $r_3(k)$, and $r_4(k)$ to generate fewer output values than read-back signals. For example, read-back signals $r_2(k)$, $r_3(k)$, and $r_4(k)$ may be utilized to generate data symbol sequence $a_3(k)$ corresponding with data track T3 (i.e., the data track read by the middle read element).

Cancellation receiver 104 utilizes space-time interference cancellation filter 106 (hereinafter, cancellation filter 106) to filter the inter-track interference (and other noise elements) associated with one or more of the read-back signals $r_2(k)$, $r_3(k)$, and $r_4(k)$ based on the plurality of read-back signals. The output of cancellation filter 106 is one or more filtered read-back signals that provide a maximum signal-to-interference-plus-noise ratio for each respective data track. For example, in the embodiment shown in FIG. 1, cancellation filter 106 generates filtered read-back signals $z_2(k)$, $z_3(k)$, and $z_4(k)$ with respect to each of the plurality of read-back signals $r_2(k)$, $r_3(k)$, and $r_4(k)$, respectively. However, in other embodiments the cancellation filter may generate a filtered read-back signal for only a single track of data (e.g., data track T3 in the embodiment shown in FIG. 1), based on the plurality of read-back signals $r_2(k)$, $r_3(k)$, and $r_4(k)$.

Figure 2:
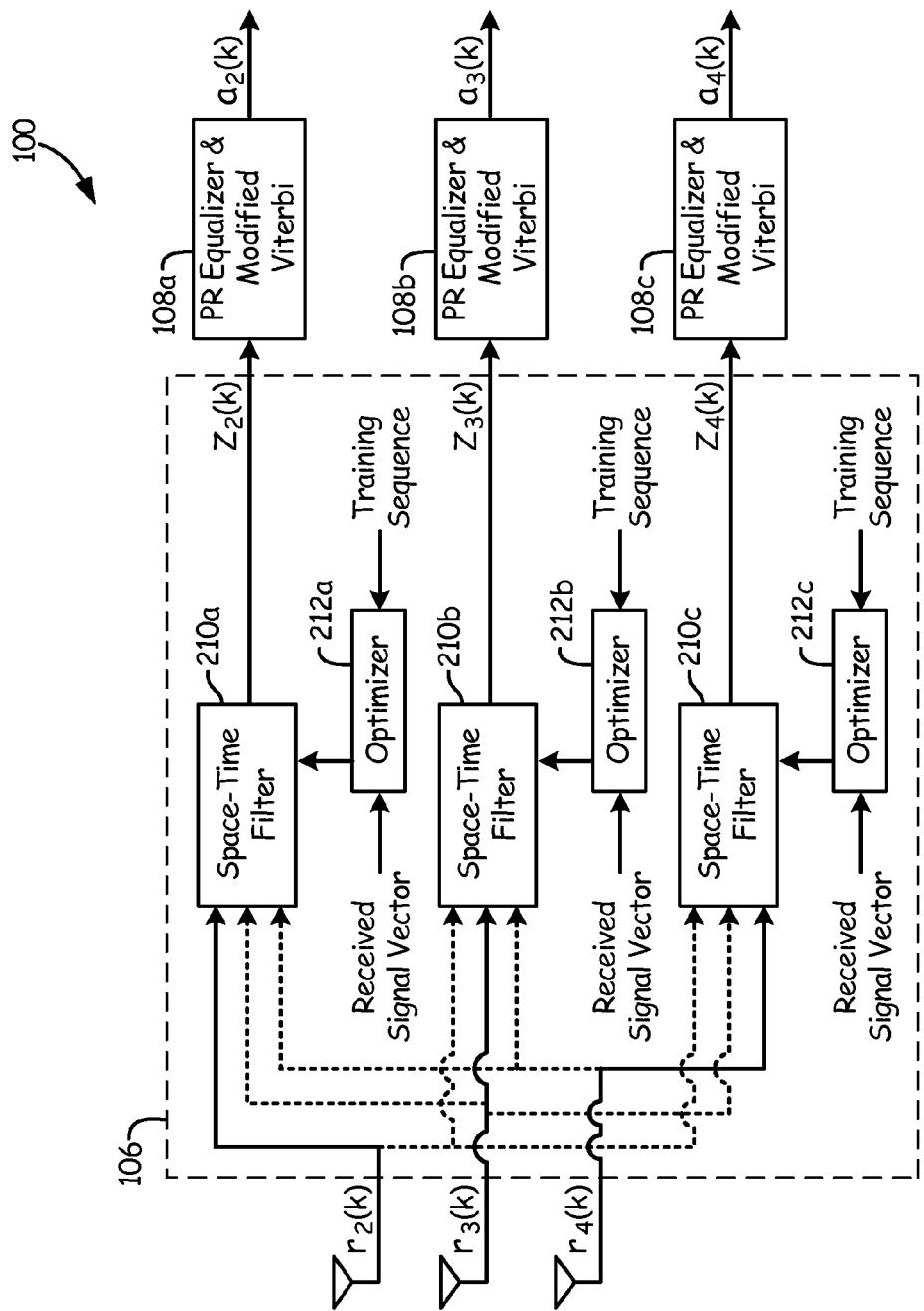
FIG. 2 is a block diagram illustrating in additional detail the low-complexity inter-track interference and cancellation receiver according to an embodiment of the present invention.

As described in more detail with respect to FIG. 2, space-time interference cancellation filter 106 seeks to maximize a signal to interference plus noise (SINR) signal for the data track of interest. For example, cancellation filter 106 seeks to generate a filtered read-back signal $z_2(k)$ that maximizes the SINR for data track T2. Partial response (PR) equalizer and modified Viterbi detectors 108a, 108b, and 108c are single-dimensional detectors (i.e., operate under the assumption that each filtered read-back signal is responsive to a single data track). This is in contrast with joint Viterbi detectors, which rely on an iterative approach to detecting data streams from within a plurality of read-back signals having inter-track interference (ITI) components. In essence, the present disclosure avoids multi-dimensional Viterbi detectors (and the complexity associated therewith) by handling inter-track interference (ITI) issues via space-time interference cancellation filter 106. The result is a low-complexity ITI and cancellation receiver that is able to account, with minimal complexity, for ITI associated with each read-back signal.

FIG. 2 is a block diagram illustrating in additional detail the space-time interference cancellation filter 106 (hereinafter, cancellation filter 106) according to an embodiment of the present invention. The cancellation filter 106 is described with respect to a magnetic recording system utilizing N read elements (e.g., RE2, RE3, and RE4) positioned over N tracks of interest (e.g., data tracks T2, T3, and T4). For purposes of this discussion, inter-track interference is assumed to be generated only by adjacent tracks (e.g., inter-track interference generated by read element RE2 is limited to tracks T1 and T3), wherein L represents the total number of tracks sensed. For example, in the embodiment shown in FIG. 2, L is equal to five due to three read elements employed.

In the embodiment shown in FIG. 2, cancellation filter 106 includes a plurality of space-time filters 210a, 210b, and 210c, respectively, along with a plurality of optimizers 212a, 212b, and 212c. The read-back signals $r_2(k)$, $r_3(k)$, and $r_4(k)$ provided by read elements RE2, RE3, and RE4, respectively, are provided to each of the space-time filters 210a, 210b, and 210c. For example, space-time filter 210a receives read-back signals $r_2(k)$, $r_3(k)$, and $r_4(k)$. Similarly, space-time filters 210b and 210c each receive all three read-back signals $r_2(k)$, $r_3(k)$, and $r_4(k)$. Based on the plurality of received read-back signals $r_2(k)$, $r_3(k)$, and $r_4(k)$, each of the plurality of space-time filters 210a, 210b, and 210c acts to maximize the signal to interference plus noise ratio (SINR) associated with the desired data track. For example, space-time filter 210a maximizes, based on the plurality of read-back signals $r_2(k)$, $r_3(k)$, and $r_4(k)$, the signal-to-interference-plus-noise ratio (SINR) value associated with data track T2. That is, space-time filter 210a reduces the components of read-back signal $r_2(k)$ attributable to adjacent data tracks T1 and T3 and maximizes the components of read-back signal $r_2(k)$ attributable to data track T2.

In the embodiment shown in FIG. 2, space-time filters 210a, 210b, and 210c utilizes a plurality of weights w2, w3, and w4, respectively, to maximize the SINR value associated with the target data track. The weights w2, w3, and w4 are generated by optimizers 212a, 212b, and 212c, respectively, based on training sequences provided as an input to each optimizer. The weights w2, w3, and w4 utilized by space-time filters 210a, 210b, and 210c take into account the channel response to a sequence of data. More generically, space-time filters 210a, 210b, and 210c are designed based on information regarding the channel response. Assuming complete knowledge of each channel, space-time filters 210a, 210b, and 210c can be designed as described below.

A multiple-input, multiple-output (MIMO) continuous time model is utilized to design the desired weights w2, w3, and w4, as describe in the process outline below. Mathematically, the read-back signal generated by each read element RE2, RE3, and RE4 can be expressed as shown in Equation 1:

$$r_i(t) = \sum_{l=1}^{L} \sum_{m=-\infty}^{\infty} a_{lm} h_{il}(t-mT) + n_i(t) \qquad \text{Eq. 1}$$

The term $a_{lm}$ represents the sequence of symbols (−1, 1) written on track l, $k_{il}(t)$ is the impulse response of ith head to lth track, $n_i(t)$ is electronics noise, and T is the symbol period. By assuming that only adjacent tracks provide interference, Eq. 1 can be expressed as:

$$r_i(t) = \sum_{m=-\infty}^{\infty} a_{mi} h_{ii}(t-mT) + \sum_{m=-\infty}^{\infty} a_{m(i-1)} h_{i(i-1)}(t-mT) + \sum_{m=-\infty}^{\infty} a_{m(i+1)} h_{i(i+1)}(t-mT) + n_i(t) \qquad \text{Eq. 2}$$

The term $$\sum_{m=-\infty}^{\infty} a_{mi} h_{ii}(t-mT)$$

represents the read-back signal generated in response to the target track, the term $$\sum_{m=-\infty}^{\infty} a_{m(i-1)} h_{i(i-1)}(t-mT)$$

represents the read-back signal generated in response to one of the tracks adjacent to the target track (e.g., ITI effects from a first adjacent track), and the term $$\sum_{m=-\infty}^{\infty} a_{m(i+1)} h_{i(i+1)}(t-mT)$$

represents the read-back signal generated in response to the other track adjacent to the target track (e.g., ITI effects from a second adjacent track).

An equivalent MIMO discrete-time model can be obtained in a way similar to that of the MIMO continuous-time model. A discrete-time representation of the read-back signal generated by each read element RE2, RE3, and RE4 can be expressed as shown in Equation 3:

$$r_{i,k} = \sum_{j=0}^{L_c} \sum_{p=1}^{L} a_{p,k} h_{i,p,j} + n_{i,k} \quad i=2,3,4 \; k \in Z \qquad \text{Eq. 3}$$

The term $L_c+1$ represents the channel spread (i.e., the number of channel symbols being sensed by read elements RE2, RE3, and RE4), the term $a_{p,k}$ represents the sequence of symbols (−1, 1) written on track p, $h_{i,p,j}$ is the impulse response of ith head to track p, and $n_{i,k}$ is sampled electronics noise. Media noise can be incorporated, wherein a received vector is represented as $y_k=[r_{2,k}, r_{3,k}, r_{4,k}]^T$, the symbol sequence written to the magnetic media on the mth track is represented as $a_{m,k}=[a_{m,k-L_c}, \ldots, a_{m,k}]^T$, the sample electronics noise vector is represented as $v_k=[n_{2,k}, n_{3,k}, n_{4,k}]^T$, and the sampled media noise vector is represented as $\epsilon_k=[\psi_{1,k}, \psi_{2,k}, \psi_{3,k}, \psi_{4,k}]^T$. As a result, the desired output of space-times filters 210a, 210b, and 210c can be expressed as:

$$y_k = \sum_{m=1}^{L} H_m a_{m,k} + \sum_{m=1}^{L} H_m \xi_k + v_k \qquad \text{Eq. 4}$$

The matrix $H_m$ represents the dibit response from all read elements to the mth track, under the assumption that only adjacent tracks interfere with the dibit response of the track of interest, resulting in some of the matrix entries being equal to zero.

In the embodiment shown in FIG. 2, space-time filters 210a, 210b, and 210c are designed to maximize SINR subject to PR target constraints for the track of interest. Optimizer 212a, 212b, and 212c are responsible generating the weights w2, w3, and w4 utilized by space-time filters 210a, 210b, and 210c, respectively (bold terms indicate the variable represents a vector or matrix). Mathematically, the design of weights utilized by space-time filters 210a, 210b, and 210c can be described as follows below. For example the desired output of space-time filter 210a can be expressed as:

$$z_{2,k} = w_2^T y_k \qquad \text{Eq. 5}$$
$$= w_2^T H_2^T a_{2,k} + \sum_{m=1,m\neq 2}^{3} w_2^T H_m a_{m,k} + \sum_{m=1,m\neq 2}^{3} w_2^T H_m \xi_k + w_2^T v_k$$

The term $$w_2^T H_2^T a_{2,k}$$

is associated with the target data track (e.g., track T2) and utilizes weights $w_2^T$ to maximize the response associated with the target track. Once again, variables presented in bold indicate a vector or matrix term, and the superscript value T indicates the vector or matrix is transposed. The term $$\sum_{m=1,m\neq 2}^{3} w_2^T H_m a_{m,k}$$

is associated with the inter-track interference (ITI) generated by adjacent data tracks (e.g., tracks T1 and T3), and utilizes weights $w_2^T$ to minimize the response associated with these adjacent tracks. The term $$\sum_{m=1,m\neq 2}^{3} w_2^T H_m \xi_k + w_2^T v_k$$

represents noise associated with adjacent data tracks (e.g., tracks T1 and T3). Based on Eq. 3 provided above, the signal to interference plus interference ratio (SINR) for the selected target track (e.g., track T2) can be obtained by the following equation:

$$SINR_2 = \frac{w_2^T H_2 H_2^T w_2}{w_2^T (H_{iti} + H_{media} + R_e) w_2} \quad \text{Eq. 6}$$

With respect to Equation 4, the terms $H_{ITI}$, $H_{media}$, and $R_e$ represent characteristics of the channels. Specifically, the terms $H_{ITI}$, $H_{media}$, and $R_e$ are represented as $$H_{ITI} = \sum_{m=1, m \neq 2}^{3} H_m H_m^T,$$

the term $$H_{media} = \sum_{m=1, m \neq 2}^{3} H_m R_m H_m^T,$$

and the term $R_e$ represents the autocorrelation of the electronics noise and the term $R_m$ is the autocorrelation matrix of the media noise component. The optimal weights $w_2^{opt}$ are obtained by maximizing the SINR ratio utilizing the following equation:

$$w_2^{opt} = \mathrm{argmax}_{w_2} \frac{w_2^T H_2 H_2^T w_2}{w_2^T (H_{iti} + H_{media} + R_e) w_2} \quad \text{Eq. 7}$$

In one embodiment, Eq. 7 can be reduced by defining $A=H_2 H_2^T$ and $B=H_{iti}+H_{media}+R_e$. As a result, Eq. 7 can be expressed as the solution of a generalized eigenvalue proglem, in which the optimal solution is the 'dominant' generalized eigenvector of the matrix pencil $\{A,B\}$. The 'dominant' eigenvector corresponds to the largest generalized eigenvalue $\lambda$ that satisfies the equation:

$$Aw_2 = \lambda B w_2 \quad \text{Eq. 8}$$

The optimal weight $w_2$ can therefore be expressed as:

$$w_2^{opt} = \mathrm{Dom.}\ eigv((H_{iti} + H_{media} + R_e)^{-1} H_2 H_2^T) \quad \text{Eq. 9}$$

The same process is used to select the optimized weights $w_3$ and $w_4$. In this way, space-time filters 210a, 210b, and 210c are designed to maximize the SINR signal associated with a particular data track based on read-back signals provided by each of the plurality of read elements (e.g., RE2, RE3, and RE4). The optimal solution illustrated by Eq. 9 requires explicit channel information—that is, knowledge of the matrices $H_{iti}$, $H_{media}$, and $R_e$. Without explicit channel information, other methods of selecting/designing optimized weight must be utilized.

In the embodiment shown in FIG. 2, in lieu of explicit knowledge of each channel, training sequences and received signal vectors are utilized and optimizers 212a, 212b, and 212c are employed to generate weights w2, w3, and w4, respectively. Training sequences represent a sequence of bits [1, −1] written to a magnetic media, and the received signal vector represents the read-back signal generated in response to the training sequence by the selected receiver. Based on a known input, and the resulting output, a joint optimization equation can be used to select the weights w2, w3, and w4 that will result in the maximum SINR value. In this way, space-time filters 210a, 210b, and 210c represent multiple-input, single output type space-time filters.

For example, the following equations describe how a training sequence can be used to generate optimal weights for space-time filters 210a, 210b, and 210c. Let received data matrix $$\bar{y}_k = [y_k^T, \ldots, y_{k-L_t}^T]^T,$$

wherein $L_t+1$ is length of time taps. In an exemplary embodiment, a training (or preamble) sequence written to track m is expressed as $[S_{m,\ k-Lc-Lt},\ \ldots,\ S_{m,\ k+p}]$, wherein p is a parameter which determines the length of the training sequences. In the embodiment described with respect to FIG. 1, in which five data tracks contribute to sensed signals, m=1, 2, 3, 4, 5. In turn, the received data matrix corresponding to the preamble sequences is expressed as $\bar{Y} = [\bar{y}_k, \ldots, \bar{y}_{k+p}]$.

A Toeplitz matrix is constructed with the preamble sequence written on track 2 with $[S_{2,k},\ \ldots,\ S_{2,\ k-Lc-Lt}]$ expressed in the first column and received data matrix $[S_{2,k},\ \ldots,\ S_{2,\ k+p}]$ corresponding to this preamble sequence expressed n the first row:

$$s_2 = \begin{bmatrix} s_{2,k} & \cdots & s_{2,k+p} \\ \vdots & \ddots & \vdots \\ s_{2,k-L_c-L_t} & \cdots & \cdots \end{bmatrix} \quad \text{Eq. 8}$$

The joint optimization problem can be formulated as follows:

$$w_2^{opt}, g_2^{opt} = \mathrm{argmax}_{w_2, g_2} \frac{\|g_2^T s_2\|_F^2}{\|w_2^T \bar{Y} - g_2^T s_2\|_F^2} \quad \text{Eq. 9}$$

where $w_2$ is a $N(L_t+1)*1$ MISO space-time filter and $g_2=[g_{2, L_c+L_t}, \ldots, g_{2,0}]^T$ is the post-filtering channel response corresponding to track 2. The joint optimization problem can be formulated as a generalized eigenvalue problem, wherein $$z = [w_2^T, g_2^T]^T,$$

$$V = [\bar{Y}^T, -S_2^T]^T,$$

and $$U = [0, S_2^T]^T.$$

As a result, Equation 7 can be expressed as:

$$z^{opt} = \text{argmax}_z \frac{z^T U^T U z}{z^T V^T V z} \quad \text{Eq. 10}$$

As a result, the optimal solution is given by:

$$z^{opt} = \text{Dom. eigv}((V^T V)^{-1} U^T U) \quad \text{Eq. 11}$$

In this way, space-time filters 210a, 210b, and 210c are optimized, either via full channel information or training sequences, to maximize the signal to noise plus interference ration (SINR) value associated with the target data track. The filtered read-back signal generated by space-time filters 210a, 210b, and 210c is provided to PR equalizer and modified Viterbi detector 108a, 108b, and 108c, respectively, which operates in the usual manner to detect the digital data sequence based on the filtered read-back signal. The filtering provided by space-time filters 210a, 210b, and 210c allows PR equalizer and modified Viterbi to be single-dimension detectors. The complexity of single or one-dimensional detectors is much less than multi-dimension or joint detectors, which are responsible for detecting data symbols in interfering read-back signals.

In this way, the present disclosure provides a solution to handling increased ITI created by ever decreasing track pitches relative to read element widths. In particular, the system described herein utilizes a plurality of read-elements that allows for cancellation of noise associated with adjacent data tracks based on information gleaned from read-back signals provided by adjacent read elements. A benefit of utilizing space-time filters to handle ITI associated with the plurality of data tracks is that it is computationally much less complex than implementing a multi-dimensional PR equalizer and Viterbi detector. In this way, conventional single-dimensional PR equalizer and Viterbi detectors may be utilized, wherein the space-time interference cancellation filter handles maximizing of the read-back signal associated with the target data track, which in turn includes minimizing read-back signals generated in response to data tracks other than the target data track.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A receiver for a magnetic storage medium configured to receive read-back signals provided by a plurality of read elements positioned over a plurality of data tracks, the read channel comprising:
    at least one space-time interference cancellation filter configured to receive read-back signals generated by the plurality of read elements and to provide a filtered read-back signal associated with one of the plurality of read element based on the plurality of read-back signals; and
    at least one 1-dimensional Viterbi detector configured to receive a filtered read-back signal from one of the plurality of space-time interference cancellation filters, and to provide in response an output representative of a data sequence written to one of the plurality of data tracks.

2. The receiver of claim 1, wherein the space-time interference cancellation filters maximizes a signal to noise plus interference ratio (SINR) signal associated with one of the plurality of received read-back signals.

3. The receiver of claim 2, wherein the space-time interference cancellation filters utilizes weights to maximize the SINR signal associated with one of the plurality of received read-back signals.

4. The receiver of claim 1, further including a plurality of space-time interference cancellation filters, each configured to receive read-back signals generated by the plurality of read elements to provide a filtered read-back signal associated with associated data tracks based on the plurality of read-back signals.

5. The receiver of claim 4, further including a plurality of one-dimensional Viterbi detectors, each configured to receive a filtered read-back signal from one of the plurality of space-time interference cancellation filters and to provide in response an output representative of a data sequence written to one of the plurality of data tracks.

6. A magnetic storage system comprising:
    a magnetic medium having a plurality of data tracks;
    a plurality of read elements, each read element positioned over one of the plurality of data tracks and configured to generate a read-back signal in response, at least in part, the data track associated with the read element;
    a plurality of space-time interference cancellation filters, each space-time interference cancellation filter configured to receive read-back signals generated by the plurality of read elements and provides a filtered read-back signal associated with one of the data tracks; and
    a plurality of one-dimensional Viterbi detectors, wherein each one-dimensional Viterbi detector is configured to receive a filtered read-back signal from one of the plurality of space-time interference cancellation filters, and to provide in response an output representative of a data sequence written to one of the plurality of data tracks.

7. The magnetic storage system of claim 6, wherein each of the plurality of space-time interference cancellation filters maximizes a signal to noise plus interference ratio (SINR) signal associated with one of the plurality of received read-back signals.

8. The magnetic storage system of claim 7, wherein each of the plurality of space-time interference cancellation filters utilizes weights to maximize the SINR signal associated with one of the plurality of received read-back signals.

9. The magnetic storage system of claim 6, wherein the read channel is a multiple-input, multiple-output read channel that detects data sequences sensed by each of the plurality of read elements.

10. The magnetic storage system of claim 6, wherein the read channel is a multiple-input, single output read channel that detects a data sequence sensed by one of the plurality of read elements.

11. A method of reading data from a magnetic media, the method comprising:
    generating read-backs signals using a plurality of read elements, each read element positioned over one of a plurality of data tracks;
    providing each of the plurality of read-back signals to at least one space-time cancellation filters; and
    generating, in response to the plurality of read-back signals, a filtered output that maximizes a signal associated with one of the plurality of data tracks;

applying a one-dimensional Viterbi detector to the filtered output to generate an output representative of a data sequence written to one of the plurality of data tracks.

12. The method of claim 11, wherein generating a filtered output includes applying a plurality of weights to the received read-back signals in order to generated a filtered output that maximizes a signal to interference plus noise ratio (SINR) associated with one of the plurality of data tracks.

13. The method of claim 11, further including:
providing each of the plurality of read-back signals to a plurality of space-time cancellation filters, wherein each of the plurality of space-time cancellation filters generates a filtered output with respect to one of the plurality of data tracks.

14. The method of claim 13, further including:
applying a one-dimensional Viterbi detector to each of the plurality of filtered outputs to generate outputs representative of data sequences written to a plurality of data tracks.

15. A method of reading data from a magnetic media, the method comprising:
generating read-backs signals using a plurality of read elements, each read element positioned over one of a plurality of data tracks;
providing each of the plurality of read-back signals to at least one space-time cancellation filters; and
generating, in response to the plurality of read-back signals, a filtered output that maximizes a signal associated with one of the plurality of data tracks, wherein generating a filtered output includes applying a plurality of weights to the received read-back signals in order to generated a filtered output that maximizes a signal to interference plus noise ratio (SINR) associated with one of the plurality of data tracks.

16. The method of claim 15, further including:
providing each of the plurality of read-back signals to a plurality of space-time cancellation filters, wherein each of the plurality of space-time cancellation filters generates a filtered output with respect to one of the plurality of data tracks.

17. The method of claim 16, further including:
applying a one-dimensional Viterbi detector to each of the plurality of filtered outputs to generate outputs representative of data sequences written to a plurality of data tracks.

* * * * *